April 5, 1966     O. T. CARLSON     3,243,919
IRRIGATING PLANT RECEPTACLE
Filed March 2, 1964
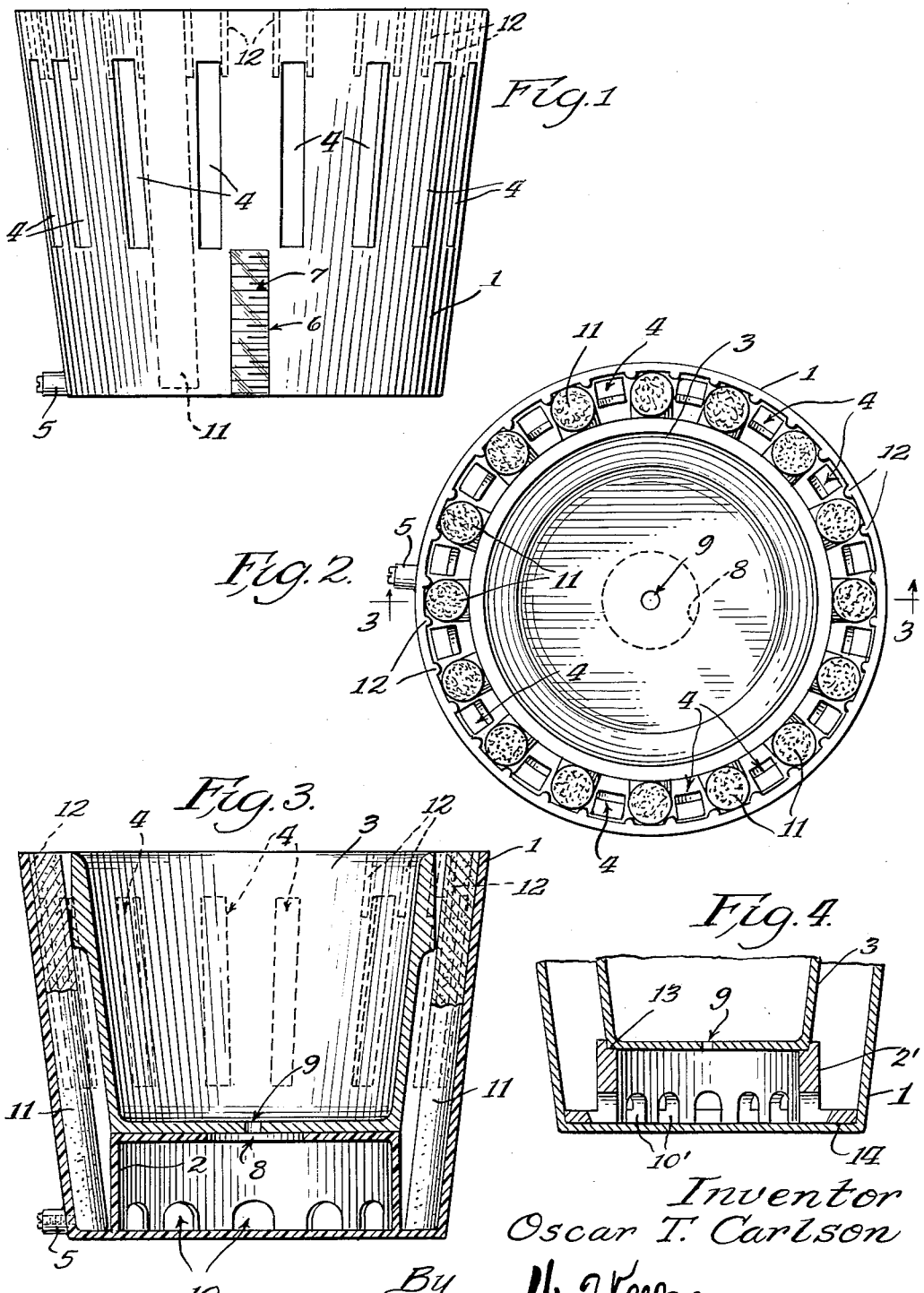
Inventor
Oscar T. Carlson
By M. F. Kellogg
Atty.

United States Patent Office 3,243,919
Patented Apr. 5, 1966

3,243,919
IRRIGATING PLANT RECEPTACLE
Oscar T. Carlson, 2001 S. Ashland Ave., Park Ridge, Ill.
Filed Mar. 2, 1964, Ser. No. 348,888
2 Claims. (Cl. 47—38)

This invention relates to improvements in plant husbandry devices, particularly, to an irrigating plant receptacle.

An important object of the invention is to provide a plant receptacle of such novel construction that it will ensure a controlled means for the continuous removal of accumulating salts in the potted soil, or rooting medium, this without excessive leaching or plant food elements therefrom, thus effecting and maintaining a healthy non-saline soil or rooting medium condition highly beneficial to the growth prospering of a potted plant or vegetation.

It is an object of the invention to provide a plant receptacle, as above, whose construction and/or design is of such simple and positive use character that no scientific or technical knowledge of the problems of detrimental soil salinity upon part of a plant caretaker is required for its proper and satisfactory usage, or for the effective controlling of the salinity of the potted soil or rooting medium.

Another and important object of the invention is to provide a plant receptacle of the indicated character so constructed and designed that only a minimum of attending care is required whereby to assure its effectiveness in and for the control of salinity of the rooting medium or soil, regardless of any specific water quality which may be used to irrigate the same in order that its salinity shall be maintained below a maximum degree, i.e., one which will be tolerated by a or the specific plant.

Yet another object of the invention resides in the provision of a plant receptacle, which in addition to functioning for the removal of accumulations of salts from soil or rooting medium therein contained, will assure an adequate irrigation and drainage of the same, hence, promoting the prolonged thriving of potted plants or vegetation.

The foregoing, as well as other objects, advantages and meritorious teachings of my invention, will be in part obvious and in part pointed out in the following detailed disclosure thereof, when taken in conjunction with the accompanying drawings, it being understood that the forms of invention presented herein are precise and what are now considered to be the better modes of embodying its principles, but that other and further modifications and changes may be made in specific embodiment without departing from its essential features.

In the drawings:

FIGURE 1 is a side elevation of my improved plant receptacle.

FIGURE 2 is a top view thereof.

FIGURE 3 is a vertical section taken on the line 3—3 of FIGURE 2, looking in the direction in which the arrows point, and FIGURE 4 is a fragmentary detail in vertical section through the lower portion of the plant receptacle showing a modified form of supporting base for the inner or nested plant containing pot or receptacle.

Referring in detail to the drawings, the invention, generally stated, comprises an outer receptacle 1 of suitable shape and size, a supporting base or stand 2, and a conventional type of plant receptacle or pot 3 overall shape somewhat similar to that of the outer receptacle 1, but less or smaller size, the same being nestingly received within said outer receptacle and resting or supported on the base 2 with its side walls spaced from the outer receptacle walls and in substantially parallel relation thereto, as clearly shown in the FIGURES 2 and 3, the purpose of which is hereinafter described.

The outer receptacle 1, made of suitable material such as plastic (opaque, translucent or otherwise), metal, tile, ceramic, vitreous, etc., has a plurality of longitudinally disposed openings or slots 4 formed in and about its side walls intermediately of its bottom and open top, and a stoppled or valved drain 5 adjacent said bottom. A longitudinally disposed translucent or transparent panel 6 is formed in or otherwise provided to one portion of the receptacle side walls below the openings or slots 4 and is calibrated with suitable scale markings 7.

The supporting base or stand 2, of inverted cup-like form and of a diameter of width less than that of the lower portion of the outer receptacle 1, is within the same and integral with its flat bottom. Its side walls are substantially parallel to those of the outer receptacle and, preferably, spaced therefrom at distances corresponding to that between them and the plant receptacle or pot walls. An opening or way 8 is formed in the top of the base registering with one in the bottom of the plant receptacle or pot, indicated at 9. Ports or ways 10 are formed in the lower marginal end of the stand whereby to permit the flowing of water therethrough.

In order that the water portion of the solution received within the base 2 from soil or other rooting medium contained in the pot 3 via its ports 10 will be disposed of at a desired rate by evaporation, a predetermined number of absorbent bodies, cylindrically or otherwise shaped and indicated by the reference numeral 11, are inserted into and about the space between the outer receptacle and plant receptacle walls adjacent the openings or slots 4. To assure their retention in spaced and longitudinally disposed relation, as above, it is preferable that pairs of relatively spaced guide and retaining ribs, or other suitable projections 12, be provided on appropriate portions of the inner surfaces of the outer receptacle side walls, as shown in FIGURES 2 and 3.

Whereas I have illustrated (FIGURE 3) the base or stand 2 as being of an inverted cup-like form, it may, of course, be changed or modified. One such modified form of the base or stand is shown in the FIGURE 4, wherein the base consists of an open ended cylindrical body 2' of a diameter similar to that of the base 2, having its upper end inwardly rabbeted or shouldered as at 13, and its lower end ported, as at 10' and laterally flanged, at 14, to an extent that it will be snugly yet removably seated on the bottom of the outer receptacle 1. Thus, the bottom at the plant receptacle 3 will be received on the shouldered end and firmly seated on the body 2'.

At this point (prefatorially stated) it will be understood that all waters used for municipal and/or domestic water supplies contain more or less dissolved salt. These municipal and domestic water supplies, in household usage termed "tap water," are used universally for the irrigation of soils and other rooting media supporting potted plants in homes. In potted plant culture, water is evaporated and transpired from the plant leaves and is also evaporated from the surface of the rooting medium, but, nearly all the dissolved material remains behind to accumulate in the rooting medium. Some continuous and controlled means for the removal of the accumulating salt must be provided if an equilibrium in the salt concentration of the soil or rooting medium is to be maintained at a level below the tolerance of the plants being grown. The removal of the salt can be accomplished only by applying more water to the rooting medium than is needed to supply the evaporation and transpiration needs of the plant, and the evaporation needs of the rooting medium and thus, causing a part of the water applied to move completely through the rooting medium, dissolving and carrying the excess salt with it. This process of removal of soluble material by the passage of water through a porous medium is termed "leaching." The fraction of the applied irrigation water needed for leaching to maintain the soil salinity below some specific level considered harmful is termed the leaching requirement or leach water ratio. Only if this excess water can be drained from the plant receptacle containing the rooting medium, with no possibility of reversal of movement, can the salt dissolved in the excess water be positively removed from the rooting medium.

The leaching requirement of an irrigated plant receptacle regime will vary, depending principally upon the salt content of the tap water that is applied and the salt tolerance of the plant being grown. The leaching requirements to maintain the rooting medium salinities below harmful levels for the range of water qualities encountered in domestic water supplies are easily determined.

It will also be understood that evaporation and/or evapo-transpiration rates respond in a similar manner to climates typical of the house plant environment. This phenomenon is used in my invention to set and by following a simple irrigation procedure, to regulate the leach water ratio at the desired ratio. The setting of the leach water ratio is accomplished by the adjustment of the evaporative disposal capacity of the receptacle in relation to the total evapo-transpiration capacity of the receptacle to be equal to the desired leach water ratio. The regulation of the leach water ratio is then accomplished by over-irrigation of the rooting medium at each irrigation period with such an amount, more or less, which will cause an amount of leach water to accumulate in the bottom portion of the outer receptacle sufficient for supplying the ventilated evaporative disposal surfaces with leach water until the next irrigation period. A transparent window in the outer receptacle, or a translucent outer receptacle with gauged reference marks, as heretofore described, is provided to assist in determining by trial and error the amount of leach water required at each irrigation period.

In practice, it can be seen that since the evaporation phenomenon and the evapo-transpiration phenomenon respond in a similar manner to climatic changes, that the evaporation disposal to total evapo-transpiration ratio will remain relatively constant regardless of normal changes in the indoor climate. Thus, by varying the evaporative disposal surface of the receptacle, the leach water disposal capacity can be adjsuted to, or set, at any desired ratio, as dictated principally by the salt content of the tap water in the market area. Then by following the above-described irrigation regime, the leach water ratio will be governed in a constant manner as long as the total evapo-transpiration capacity of the receptacle remains constant.

The evapo-transpiration capacity of the receptacle, other than that contributed by the evaporative disposal surfaces, will vary principally with the size of the plant grown in it. Therefore, for any specific leach water ratio, the evaporative disposal surfaces required for a receptacle is dependent upon the relative size of the plant received in the receptacle. In most potential market areas for my invention, the salt content of the water is known, and is relatively uniform. This will enable a desirable leach water ratio to be set for the market area. Consequently, all that need be specified in marketing a receptacle of any particular size in a specific area in regard to the evaporative disposal surfaces is the number of these surfaces to use for a small, medium, or large size of plant, which would normally be grown in the receptacle.

While the evaporative disposal surfaces provide for the disposal of the water portion of the leach water solution into the atmosphere, the evaporative disposal surfaces become the repository of the salt portion of the solution. It will, therefore, become necessary to periodically disposed of the accumulated salt by replacing the surfaces or by washing them free of salt. The procedure will, of course, depend upon the type of evaporatve disposal surface furnished.

It is obvious to one skilled in the art that my invention provides a method for controlled leaching, and leaching only to the extent that is necessary to maintain the salt concentration in a rooting medium below a harmful level. This feature of controlled leaching will minimize unnecessary leaching of plant food from the rooting medium. However, in regions where, due to the high salt content of tap water, a high leach water ratio is necessary, several of the many types of slow-release fertilizers with natural or artificial constraints should be used, or, as an alternative, fertilizers or fertilizer solutions should be applied frequently.

It will be necessary in the marketing of any specific size of my improved plant receptacle in a particular area only, to indicate the number of evaporative surfaces to use in relation to plant size contained, to provide evaporative surface maintenance instruction, i.e., washing or replacement instructions, and to explain the irrigation (over-irrigation) procedures to follow. Instructions for fertilization procedures will also be desirable in areas where water quality requires a high leach ratio. The instructions necessary in these areas are not peculiar to the receptacle, but to the procedure necessary to successfully grow plants using water of such quality.

Usage of the herein described plant receptacle affords additional benefits as follows:

(1) Positive drainage of the rooting medium will be maintained, in that the water contained therein is always free to move by gravity downwardly, and to drip free of the rooting medium receptacle;

(2) Positive and thorough wetting of the rooting medium will be accomplished at each irrigation period, due to the necessity to irrigate sufficiently to pass water through the rooting medium; and, (3) The created evaporative disposal surfaces will produce a desirable micro-climatic humidity increase about or surrounding the receptacle. This micro-climatic amelioration is of especial benefit to certain species of plants and the growing thereof.

I claim:
1. A plant receptacle comprising, in combination:
 (a) an outer receptacle having a plurality of relatively spaced openings in and about its sidewalls, each spaced upwardly from and beyond its bottom;
 (b) a support received on the bottom of said outer receptacle in fixed and spaced relation to its sidewalls;
 (c) the top of the support being in a horizontal plane below that of the bottoms of said spaced openings, and its sidewalls having relatively spaced ports therein adjacent and opening onto the outer receptacle bottom, and having a port formed in its top intermediately thereof;
 (d) a plant and rooting medium receiving receptacle of cross-sectional area less than that of the outer receptacle received therein and seated on the top of said support with its sidewalls in spaced relation to the outer receptacle sidewalls, terminating substantially flushly with the upper extremities thereof;
 (e) the inner sides of the outer receptacle sidewalls having vertically disposed and relatively parallel channels therein between said spaced openings extending throughout their lengths; and
 (f) absorbent devices removably received in and extending throughout each of said channels between said spaced openings.

2. The combination of claim 1, further characterized in that a transparent liquid depth indicating gauge is mounted in a portion of the sidewalls of the outer receptacle extending from its bottom to a point adjacent the relatively spaced ports of the support sidewalls.

References Cited by the Examiner

UNITED STATES PATENTS

| | | | |
|---|---|---|---|
| 102,311 | 4/1870 | Penfield | 47—38.1 |
| 608,590 | 8/1898 | Freund | 47—34.1 |
| 910,905 | 1/1909 | Clements | 47—38.5 X |
| 1,928,810 | 10/1933 | Burford | 47—34.1 X |
| 1,940,044 | 12/1933 | Brandt | 47—38.1 |
| 2,081,337 | 5/1937 | Lockyer | 47—38.1 |
| 2,238,935 | 4/1941 | Gumaer. | |
| 2,387,340 | 10/1945 | Moriarity | 47—38.2 |
| 2,491,124 | 12/1949 | Martin | 47—38.1 X |
| 2,638,716 | 5/1953 | Luipershek | 47—38.1 |

FOREIGN PATENTS

| | | |
|---|---|---|
| 471,172 | 10/1914 | France. |
| 17,940 | 10/1904 | Great Britain. |
| 291,411 | 9/1953 | Switzerland. |

ANTONIO F. GUIDA, *Acting Primary Examiner.*

ABRAHAM G. STONE, *Examiner.*

J. R. OAKS, *Assistant Examiner.*